J. M. GRISWOLD.
DIRECTION INDICATOR FOR MOTOR VEHICLES.
APPLICATION FILED AUG. 30, 1919.

1,369,336.

Patented Feb. 22, 1921.
2 SHEETS—SHEET 1.

INVENTOR.
John M Griswold
BY
Parsons Bodell
ATTORNEY.

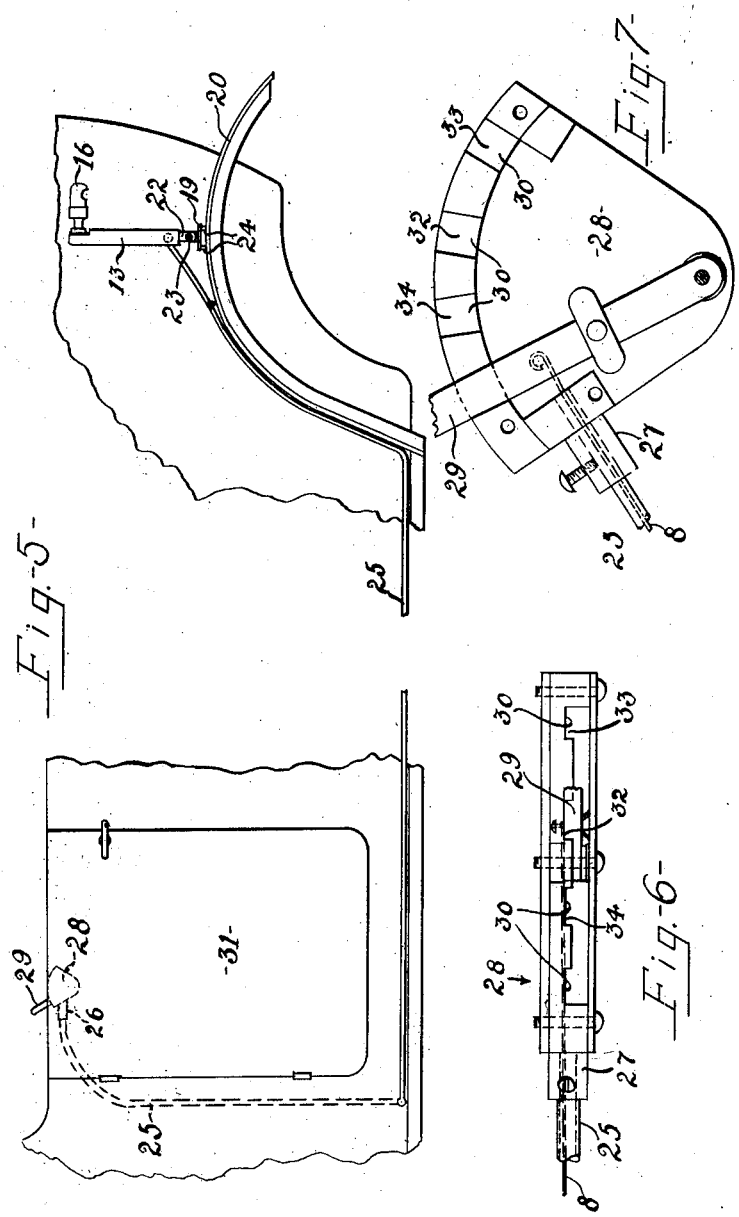

UNITED STATES PATENT OFFICE.

JOHN M. GRISWOLD, OF SYRACUSE, NEW YORK.

DIRECTION-INDICATOR FOR MOTOR-VEHICLES.

1,369,336.  Specification of Letters Patent.  Patented Feb. 22, 1921.

Application filed August 30, 1919. Serial No. 320,793.

*To all whom it may concern:*

Be it known that I, JOHN M. GRISWOLD, a citizen of the United States, and a resident of Syracuse, in the county of Onondaga and State of New York, have invented a certain new and useful Direction-Indicator for Motor-Vehicles, of which the following is a specification.

This invention relates to direction indicators for motor vehicles and has for its object a direction indicator which is particularly simple in construction and highly efficient and durable in use, and in which the moving parts are housed within a casing and are protected from the elements.

The invention consists in the novel features and in the combinations and constructions hereinafter set forth and claimed.

In describing this invention, reference is had to the accompanying drawings in which like characters designate corresponding parts in all the views.

Fig. 5 is a fragmentary view of the body of a motor car showing one way of applying my direction indicator thereto.

Figs. 6 and 7 are respectively, a plan and elevation of the handle lever and contiguous parts for controlling the operation of the indicator member.

Figure 1:
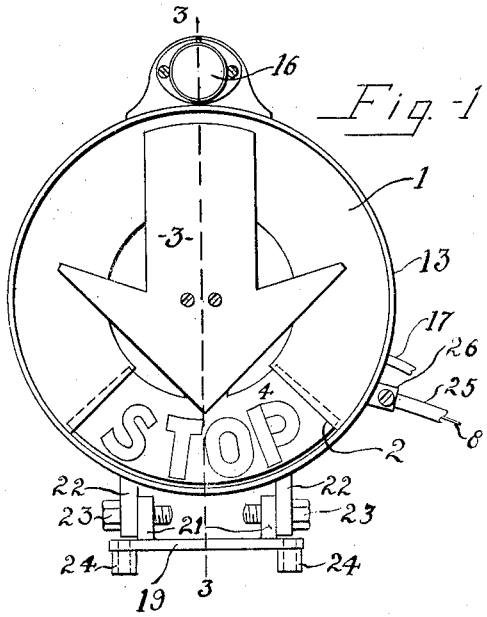
Figure 1 is a face view of a preferable form of my direction indicator.
Figure 2:
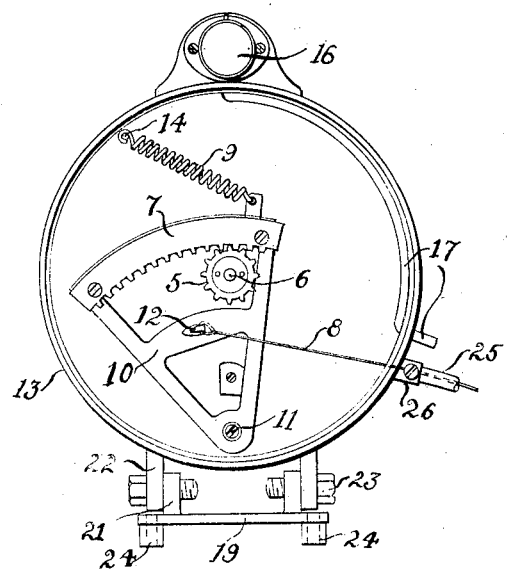
Fig. 2 is a face view with the background plate and indicator member removed showing the mechanism for operating the indicator member.
Figure 3:
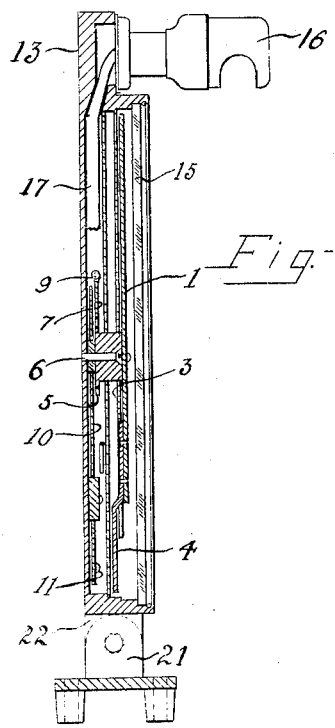
Fig. 3 is an enlarged sectional view on line 3—3, Fig. 1.
Figure 4:
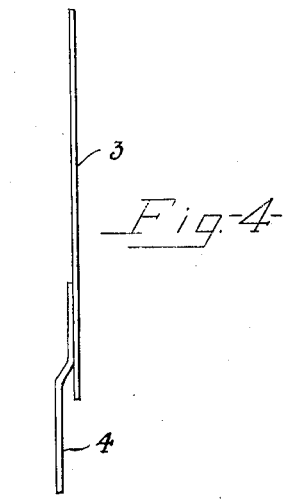
Fig. 4 is an edge view of the indicator member and signal member carried thereby.

This direction indicator comprises generally, a background member or plate having a cutout, an indicator member or pointer movable over the face of the background plate and a signal member movable with the indicator member but in the rear of the background plate and into and out of registration with the cutout, and means for operating the indicator member.

This direction indicator also comprises a case completely housing the background, indicator member and the portion of the mechanism for operating the mechanism.

1 designates the background member or plate which is discoidal in general form, and formed with a segmental cutout 2 therein.

3 is the indicator member which is in the form of a pointer or arrow movable about an axis over the face of the background 1.

4 is the signal member movable with the arrow 3 to the rear of the background plate 1 and into and out of alinement with the cutout 2. This signal member 4 is preferably carried by and fixed to the arrow 3 in front of the point of the arrow so that the arrow points to the signal member (which in this instance is usually a plate with the word "Stop" thereon), when the member 4 is exposed to view through the cutout 2.

The means for operating the indicator member 3 comprises a pinion 5 mounted upon a shaft or arbor 6 on which the indicator member 3 is mounted, a rack 7 meshing with the pinion, means as a pull cord 8 connected to the rack to move the same in one direction, and a spring 9 connected to the rack to move the same in the opposite direction.

The rack 7 is arc shaped and is mounted on a suitable carrier 10 pivoted at 11 at the axis of the arc shaped rack; and the pull cord is connected to this carrier at 12.

Preferably, the background plate, indicator and signal members 3, 4 and the operating means just described are located within a case 13 which is discoidal in general form or in the form of a short cylinder, and the shaft or arbor 6 is mounted on one end wall of the cylinder; the rack carrier 10 is pivoted to said end wall in the rear of the background plate; and the spring 9 which is connected at one end to the rack 7 is connected at its other end at 14 to said wall.

The front end of the cylinder or case is closed by a transparent or glass plate 15. The words "Front" and "Rear" are used with respect to the view point of the observer and not with respect to the way the devise is mounted upon a vehicle as in some instances as shown in Fig. 5 the indicator may be mounted upon the vehicle to face rearwardly in which case the front side of the indicator which is to signal traffic in the rear, faces toward the rear end of the vehicle.

If desired, the indicator may face forwardly on the vehicle, or a signal indicator may be of double construction so as to have a background plate; an arrow, etc., on each side thereof.

A suitable lamp housing 16 is mounted upon the peripheral wall of the case 13 and arranged to overhang the face of the indicator and the service wires 17 for said lamp as here shown extend through the peripheral wall of the case along the inside of the case into the housing 16.

The casing may be provided with means for attachment to any convenient part of the vehicle and as here shown it is provided with a base by means of which it is mountable upon the fender of the vehicle.

19 designates the base which is mountable upon the fender 20 and is provided with two upstanding lugs 21 coacting with depending lugs 22 on the casing, clamping screws 23 being passed through the lugs 21 and 22.

The base plate also has legs 24 thereon by means of which the base will find a bearing on fenders of different curvature and with different crowns. Owing to the clamping screws 23 the case can be adjusted to different angles relatively to the base 19 after the base 19 has been properly placed on the fender.

The pull cord 8 for operating the arrow 3 extends to the outside of the case 13 through the peripheral wall thereof and is operable by any suitable means located within reach of the driver of the vehicle.

As here shown, this cord 8 extends through a tube 25 connected at one end to the peripheral wall of the case or to a nipple 26 and at its other end to a nipple 27 provided on a sector 28 secured at any convenient place on the vehicle and to which is pivoted a hand lever 29 to which the cord 8 is connected, the sector 28 being provided with suitable sockets 30 into which the lever snaps to determine the position of the arrow 3.

As here shown, the sector is mounted on the inner face of the door 31 of the vehicle body and the tube 25 extends along the fender and running board through the body to the case 28 on the door. This tube is commercially flexible and is usually made up of a coiled wire.

In the event two indicators are employed, one at the front end and the other at the rear end of the vehicle, two pulley wires are operated by the lever 29 instead of one.

In operation, when the driver of the vehicle intends to drive straight ahead or is driving straight ahead, shifts the lever 29 into the notch 31, such movement permitting the spring 9 to move the rack 8 and pinion 6 and shift the arrow 3 until it points upwardly and position the stop signal behind the upper portion of the background plate 1. When he intends to turn in one direction as to the right, he shifts the lever 29 from the notch 32 into the notch 33 thus pulling on the cord 8 and shifting the arrow 3 so that it points to the right, the stop signal 4 being still located behind the background plates. When he intends to turn to the left he shifts the lever 29 into the stop 34. The spring 9 now contracts and pulls the cord 8 in the tube 25. The stop signal 4 also remains behind the background plate 1.

When he intends to come to a stop he pushes the lever forward as far as it will go into the position shown in Fig. 7 thus bringing the arrow and the stop signal in the position shown in Fig. 1.

What I claim is:

A direction indicator for motor vehicles comprising a stationary background member formed with a cutout and an indicator member movable relatively to the background member and including a pointer movable over the outer face of the background member and a signal carried by the pointer and mounted on the pointer and deflected out of the plane of the pointer in position to move behind the background member into and out of registration with the cutout, the background member having a passage for the deflected portion of the indicator member, substantially as and for the purpose described.

In testimony whereof, I have hereunto signed my name at Syracuse, in the county of Onondaga, and State of New York, this 11th day of August, 1919.

JOHN M. GRISWOLD.